US010596871B2

(12) United States Patent
Schwalbe et al.

(10) Patent No.: US 10,596,871 B2
(45) Date of Patent: Mar. 24, 2020

(54) SWINGARMS AND WHEEL SUPPORT LEGS WITH WELDMENTS INCORPORATING CASTINGS AT JOINTS

(71) Applicant: CNH Industrial America LLC, New Holland, PA (US)

(72) Inventors: Blaine A. Schwalbe, Valders, WI (US); Brian J. Pilney, West Bend, WI (US); Roy A. Bittner, Cato, WI (US); Kevin L. Weihing, Chilton, WI (US)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 15/805,542

(22) Filed: Nov. 7, 2017

(65) Prior Publication Data
US 2019/0135066 A1 May 9, 2019

(51) Int. Cl.
*B60G 7/00* (2006.01)
*A01B 69/00* (2006.01)
*B60G 13/00* (2006.01)
*B05B 13/00* (2006.01)
*B05B 15/62* (2018.01)
(Continued)

(52) U.S. Cl.
CPC ............ *B60G 7/001* (2013.01); *A01B 69/007* (2013.01); *B05B 13/005* (2013.01); *B05B 15/62* (2018.02); *B60G 7/008* (2013.01); *B60G 13/003* (2013.01); *B60G 13/005* (2013.01); *B05B 9/04* (2013.01); *B05B 15/55* (2018.02); *B60G 2200/132* (2013.01); *B60G 2204/128* (2013.01); *B60G 2204/143* (2013.01); *B60G 2300/082* (2013.01);
(Continued)

(58) Field of Classification Search
CPC ...... B60G 7/001; B60G 7/008; B60G 13/005; B60G 13/003; B60G 2204/128; B60G 2200/132; B60G 2300/083; B60G 2204/143; B05B 15/62; B05B 13/005; B05B 15/55; B05B 9/04; A01B 69/007
See application file for complete search history.

(56) References Cited

U.S. PATENT DOCUMENTS 2,000,180 A 5/1935 Wycliffe
3,983,951 A * 10/1976 Guerra ................... B60G 3/26
180/260
(Continued)

FOREIGN PATENT DOCUMENTS

DE 19611114 A1 9/1997
EP 737615 B1 5/2000
(Continued)

*Primary Examiner* — Darlene P Condra
(74) *Attorney, Agent, or Firm* — Rebecca L. Henkel; Rickard K. DeMille

(57) ABSTRACT

A swingarm includes a first swingarm leg oriented along a first horizontal plane, a main body extending upward and outward from a second end of the first swingarm leg, and a second swingarm leg extending from a second end of the main body along a second horizontal plane. The swingarm also includes a first bearing holder coupled to a first end of the first swingarm leg and a second bearing holder coupled to a second end of the second swingarm leg. The first bearing holder includes a cavity oriented horizontally to form a first pivot axis. The second bearing holder includes a cavity oriented vertically to form a second pivot axis. The first and second bearing holders are of the same construction.

19 Claims, 5 Drawing Sheets

(51) Int. Cl.
*B05B 9/04* (2006.01)
*B05B 15/55* (2018.01)

(52) U.S. Cl.
CPC .... *B60G 2300/083* (2013.01); *B60G 2300/37* (2013.01)

(56) References Cited

U.S. PATENT DOCUMENTS

| | | | |
|---|---|---|---|
| 4,168,086 A | 9/1979 | Dick et al. | |
| 5,074,581 A * | 12/1991 | Matsuoka | B60G 7/00 |
| | | | 267/217 |
| 5,664,847 A | 9/1997 | Bear et al. | |
| 6,098,287 A | 8/2000 | Takahashi et al. | |
| 6,401,857 B1 | 6/2002 | Hisada et al. | |
| 6,719,314 B1 * | 4/2004 | Schote | B60G 3/20 |
| | | | 280/124.135 |
| 6,746,032 B2 * | 6/2004 | Seki | B60G 3/20 |
| | | | 280/124.135 |
| 7,246,806 B2 * | 7/2007 | Andre | B60G 3/20 |
| | | | 280/124.106 |
| 7,392,978 B2 * | 7/2008 | Carlitz | B60G 11/14 |
| | | | 267/221 |
| 7,810,603 B2 | 10/2010 | Kofuji et al. | |
| 8,567,548 B2 | 10/2013 | Thill | |
| 8,833,779 B1 | 9/2014 | Vestrand | |
| 2003/0122328 A1 * | 7/2003 | Lin | B60G 17/005 |
| | | | 280/5.508 |
| 2010/0127471 A1 * | 5/2010 | Gazarek | B60G 3/20 |
| | | | 280/124.141 |
| 2011/0254244 A1 * | 10/2011 | Christensen | B60G 3/26 |
| | | | 280/124.139 |
| 2014/0216312 A1 * | 8/2014 | Bassett | A01B 49/04 |
| | | | 111/121 |
| 2014/0216771 A1 * | 8/2014 | Bassett | A01B 49/06 |
| | | | 172/150 |
| 2016/0073571 A1 * | 3/2016 | Hurd | A01B 35/16 |
| | | | 172/1 |
| 2016/0229480 A1 * | 8/2016 | Mori | B62D 9/02 |
| 2018/0178611 A1 * | 6/2018 | Lim | B60G 17/015 |
| 2018/0327025 A1 * | 11/2018 | Treinen | B62D 7/142 |

FOREIGN PATENT DOCUMENTS

| | | |
|---|---|---|
| JP | 2538324 B2 | 9/1996 |
| JP | 3902055 B2 | 4/2007 |

* cited by examiner

SWINGARMS AND WHEEL SUPPORT LEGS WITH WELDMENTS INCORPORATING CASTINGS AT JOINTS

FIELD OF THE INVENTION

The invention relates generally to agricultural product application equipment such as self-propelled sprayers and, in particular, to a swingarm weldment having a common bearing holder casting used at both ends.

BACKGROUND OF THE INVENTION

Current swingarms and wheel support legs of some self-propelled sprayers are weldments made entirely from welded piece-parts. Bearing holders at both ends of the swingarm and kingpin yokes at the top of the wheel support leg have numerous relatively small pieces that need to be fit-up, welded, and machined to receive bronze bearings. This can take substantial amounts of time for fabricating and assembly.

The current bronze bearing setup has grease grooves that receive grease through numerous grease fittings. These include two grease fittings for upper kingpin grease and a third grease fitting for lower kingpin grease. At each steering joint, a fourth grease fitting is provided for delivering grease to a rod end ball joint at each steering cylinder, which can require a substantial amount of time for maintenance.

As such, there is a need for relatively more straightforward fabrication and assembly of swingarms and wheel support legs and also swingarm and wheel leg support joints that have fewer grease fittings for servicing.

SUMMARY OF THE INVENTION

The present invention is directed to a swingarms that incorporate cast components into their weldments. The cast components may replace fully welded subassemblies that have relatively small components that collectively defined various connecting or joint features of the overall weldments. Polymeric bearings, thrust washers, and fewer grease fittings are used. No grease-requiring ball joint is needed at the rod end of the steering cylinder.

According to one aspect of the invention, a swingarm is provided that includes a common bearing holder casting located at both ends of the swingarm.

According to one aspect of the invention, a swingarm of an agricultural sprayer including a first swingarm leg having a first end and a second end, the first swingarm leg oriented along a first horizontal plane, a main body extending upward and outward from the second end of the first swingarm leg at an angle, the main body having a first end aligned with the second end of the first swingarm leg and a second end, and a second swingarm leg extending from the second end of the main body along a second horizontal plane, the second swingarm leg having a first end aligned with the second end of the main body and a second end. The swingarm also includes a first bearing holder coupled to the first end of the first swingarm leg and a second bearing holder coupled to the second end of the second swingarm leg. The first bearing holder includes a cavity oriented horizontally to form a first pivot axis. The second bearing holder includes a cavity oriented vertically to form a second pivot axis. The first and second bearing holders are of the same construction.

In accordance with another aspect of the invention, the first bearing holder receives a rod to pivotably couple the swingarm to a chassis frame of the sprayer along the first pivot axis. In addition, a shock absorber may be coupled to and disposed between the main body of the swingarm and the chassis frame of the sprayer. The swingarm, the first pivot axis, and the shock absorber form a suspension system of the agricultural machine.

In accordance with yet another aspect of the invention, the second bearing holder receives a steering pin to pivotably couple the swingarm to a wheel support leg of the sprayer along the second pivot axis. In addition, a hydraulic cylinder is coupled to the swingarm and the wheel support leg to control movement about the second pivot axis. The wheel support leg, the hydraulic cylinder, and the second pivot axis form a steering system of the agricultural machine.

In accordance with another aspect of the invention, the the wheel support leg includes a mounting bracket having an upper mounting arm and a lower mounting arm, a first orifice formed through the upper mounting arm, and a second orifice formed through the mounting arm and aligned with the first orifice. The second bearing holder of the swingarm is disposed between the upper and lower mounting arms to align the cavity of the second bearing holder with the first orifice of the upper mounting arm and the second orifice of the lower mounting arm along the second pivot axis.

According to another aspect of the invention, a suspension system of an agricultural sprayer includes a swingarm, a chassis frame, and a shock absorber. The swingarm includes a first swingarm leg having a first end and a second end, a main body extending from a first end aligned with the second end of the first swingarm leg to a second end, a second swingarm leg extending from a first end aligned with the second end of the main body to a second end, a first bearing holder coupled to the first end of the first swingarm leg and a second bearing holder coupled to the second end of the second swingarm leg. The first bearing holder has a cavity oriented horizontally to form a first pivot axis. The second bearing holder has a cavity oriented vertically to form a second pivot axis. Further, the first and second bearing holders are of the same construction. The chassis frame includes a rod extending perpendicularly therefrom and into the cavity of the first bearing holder along the first pivot axis. The shock absorber is coupled to and extends between the main body of the swingarm and the chassis frame.

In accordance with yet another aspect of the invention, the swingarm and the chassis frame are pivotably connected about the first pivot axis. The rod may extend perpendicularly from a mounting plate of an axle slider of the chassis frame.

In accordance with another aspect of the invention, the first swingarm leg is oriented horizontally, the main body of the swingarm extends from the first swingarm leg at an angle, and the second swingarm leg extends horizontally from the main body. The first and second swingarm legs are oriented parallel to each other on different planes.

According to yet another aspect of the invention, a steering system of an agricultural sprayer includes a swingarm, a wheel support leg, a steering pin, and a hydraulic device. The swingarm includes a first swingarm leg having a first end and a second end, a main body extending from a first end aligned with the second end of the first swingarm leg to a second end, a second swingarm leg extending from a first end aligned with the second end of the main body to a second end, a first bearing holder coupled to the first end of the first swingarm leg and a second bearing holder coupled to the second end of the second swingarm leg. The first bearing holder has a cavity oriented horizontally to form a first pivot axis. The second bearing holder has a cavity oriented vertically to form a second pivot axis. Further, the first and second bearing holders are of the same construction. The wheel support leg includes a main body with an upper portion and a lower portion, a mounting bracket disposed on an outer surface of the main body at the upper portion of the main body, and an orifice formed through the main body at the lower portion of the main body. The mounting bracket includes at least one orifice aligned with the second pivot axis. The steering pin is oriented along the second pivot axis and is disposed through the cavity of the second bearing holder and the at least one orifice of the mounting bracket. The hydraulic device is coupled to and extends from a top surface of the swingarm to a top surface of the wheel support leg.

In accordance with another aspect of the invention, the mounting bracket of the wheel support leg includes an upper mounting arm and a lower mounting arm. In this instance, the at least one orifice of the mounting bracket includes a first orifice formed through the upper mounting arm and a second orifice formed through the mounting arm and aligned with the first orifice. The second bearing holder of the swingarm is disposed between the upper and lower mounting arms to align the cavity of the second bearing holder with the first orifice of the upper mounting arm and the second orifice of the lower mounting arm.

In accordance with yet another aspect of the invention, the swingarm and the wheel support leg are pivotably connected about the second pivot axis. It is contemplated that a wheel axle may be disposed within the orifice at the lower portion of the wheel support leg to couple a wheel to the wheel support leg.

In accordance with another aspect of the invention, the first swingarm leg is oriented horizontally, the main body of the swingarm extends from the first swingarm leg at an angle, and the second swingarm leg extends horizontally from the main body. The first and second swingarm legs of the swingarm are oriented parallel to each other on different planes.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
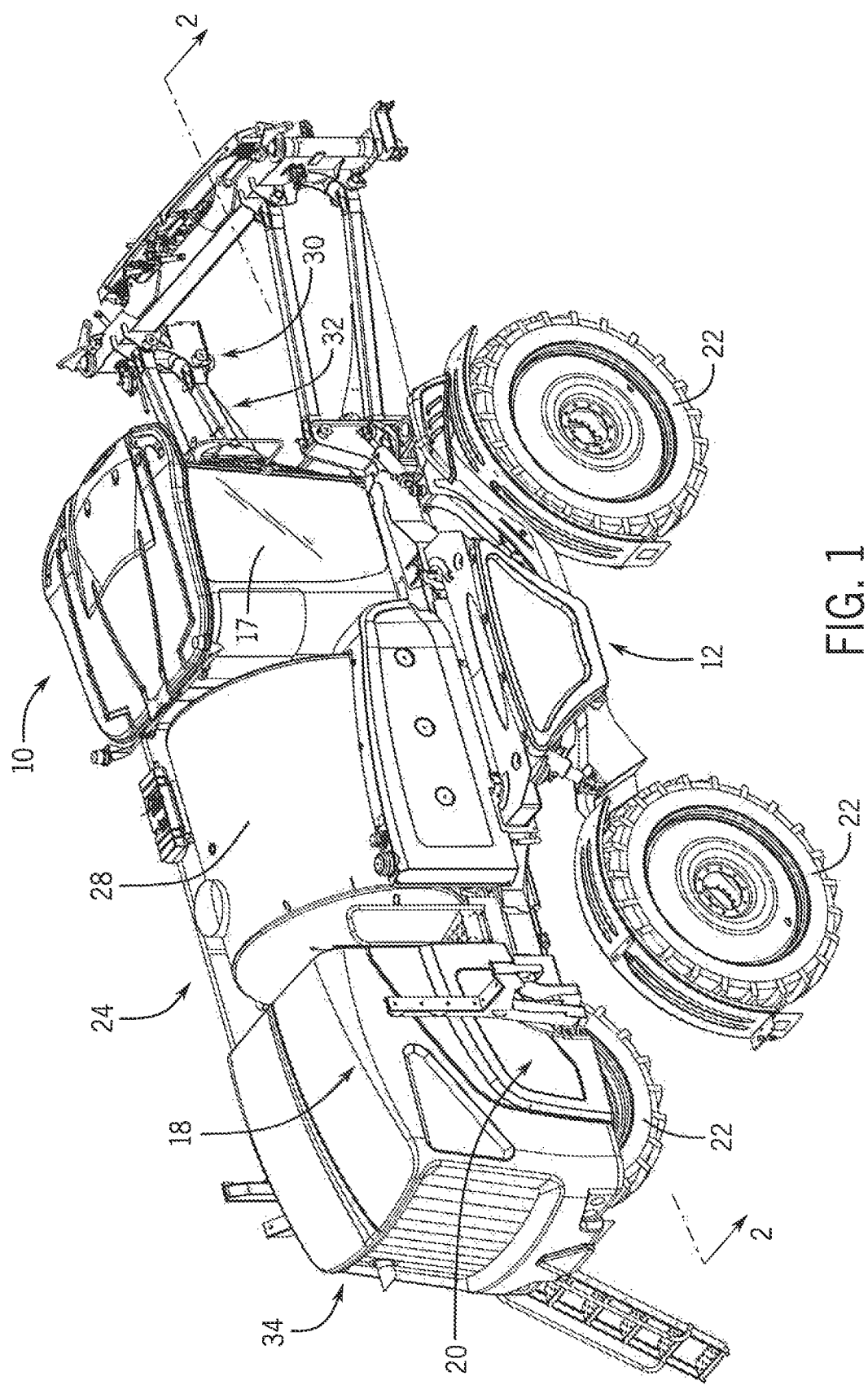
FIG. 1 is an isometric view of an agricultural machine.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH Industrial, including the Miller Nitro and Condor Series sprayers, and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

Figure 2:
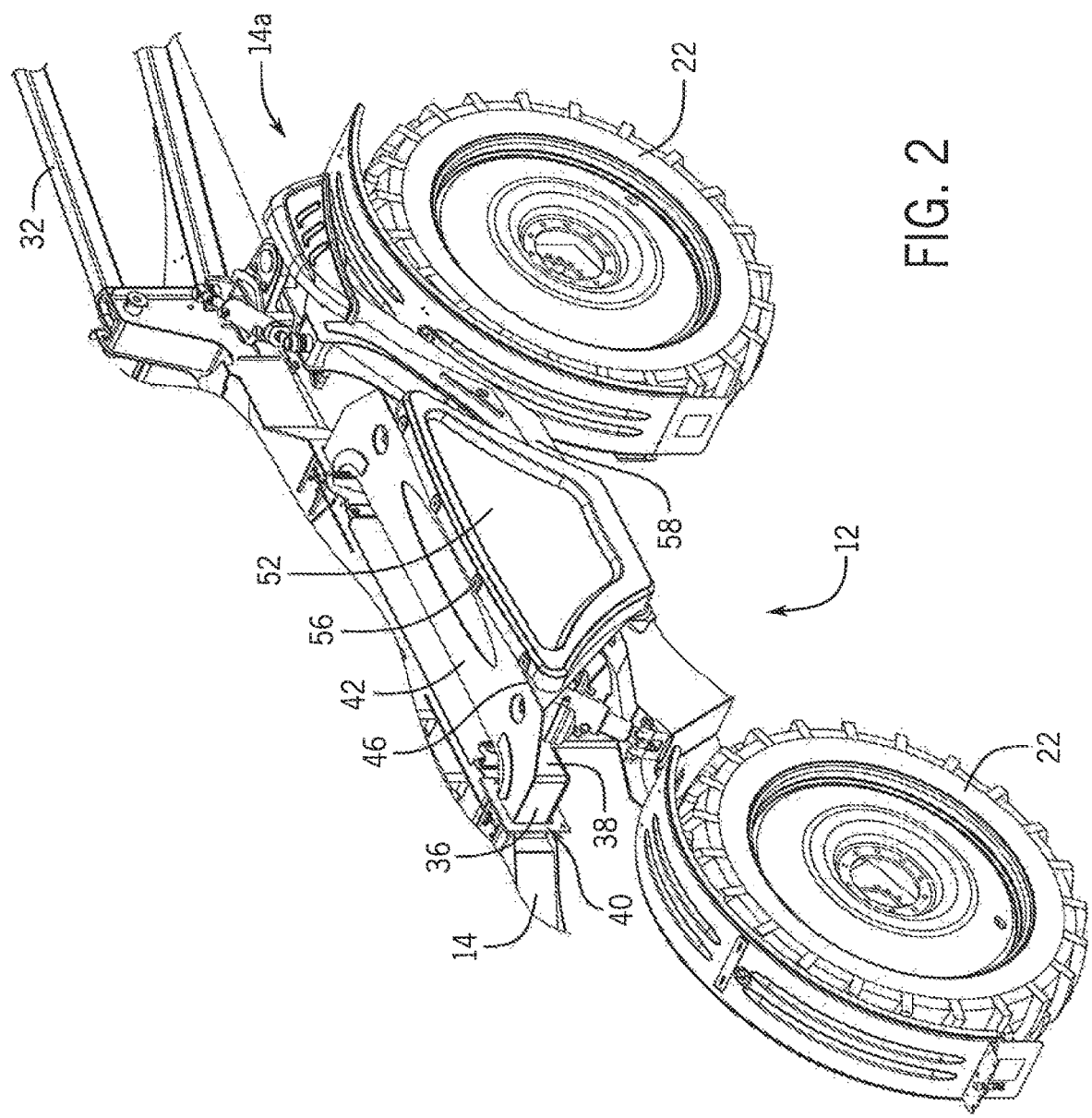
FIG. 2 is an isometric sectional view of a portion of the agricultural machine of FIG. 1, taken along line 2-2.
Figure 3:
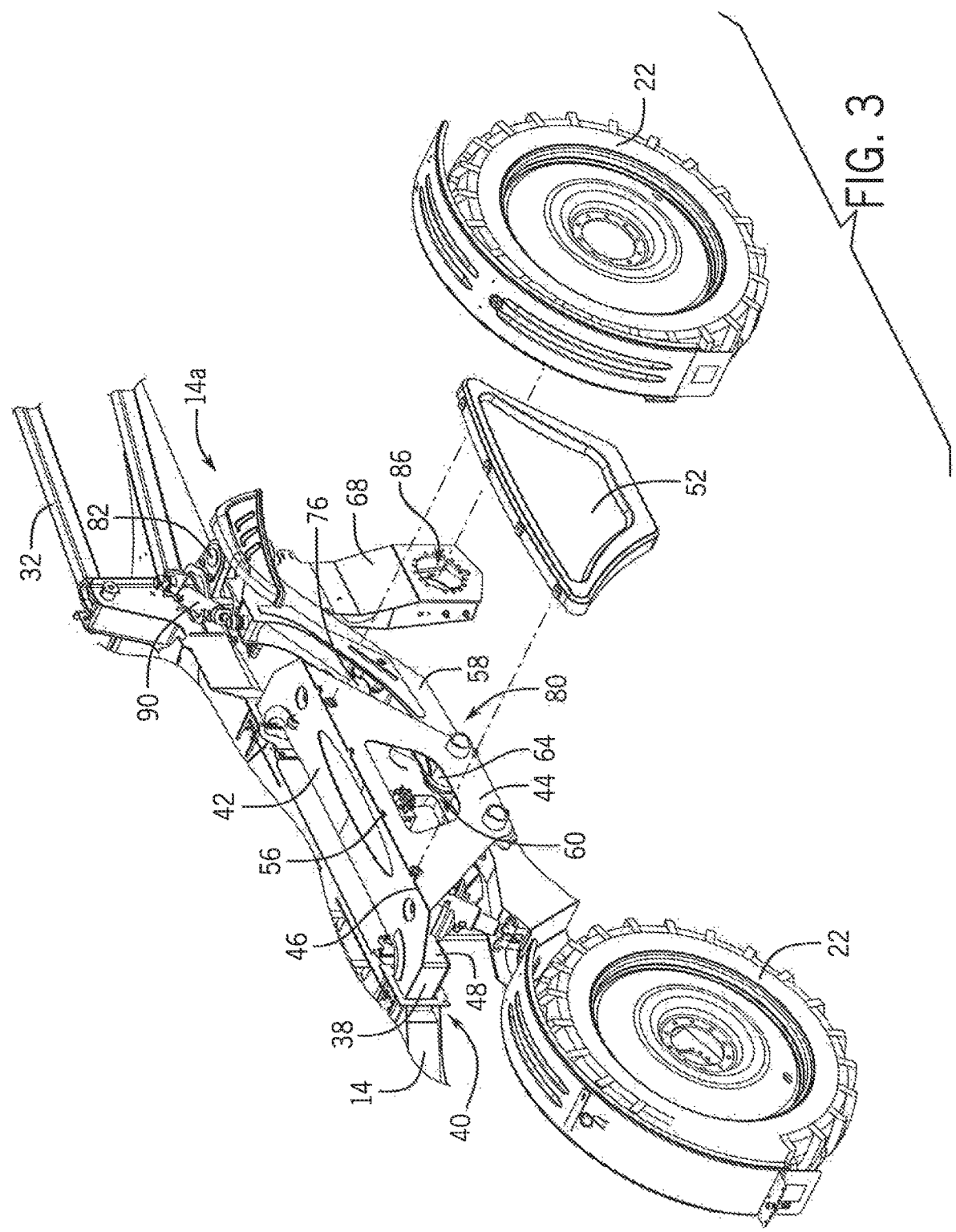
FIG. 3 is an exploded isometric view of the portion of the agricultural machine of FIG. 2.

Next, FIG. 2 illustrates an isometric sectional view of the sprayer 10 of FIG. 1, taken along line 2-2, and FIG. 3 illustrates an exploded isometric view of FIG. 2. In particular, a side portion of the sprayer 10 is shown. The chassis frame 14 includes an axle slider 36. The axle slider 36 includes a main body 38 slidably engaged with openings 40 in the chassis frame 14, which allows the axle slider 36 to move toward and away from the chassis frame 14. The axle slider 36 includes a top plate 42 that extends outward from the chassis frame 14 and beyond the main body 38 of the axle slider 36. The axle slider 36 further includes a mounting plate 44 (shown in FIG. 3) extending perpendicularly from an edge 46 of the top plate 42. The mounting plate 44 is oriented parallel to an outer surface 48 of the main body 38 of the axle slider 36. As depicted in FIG. 3, a cavity 50 is disposed between the mounting plate 44 and the outer surface 48 of the main body 38, which allows for components to be disposed between the main body 38 and the mounting plate 44, such as a swingarm 58 and a shock absorber 76, which will be described in further detail below.

FIGS. 2 and 3 show a cover 52 disposed over the outer surface 54 of the mounting plate 44. In the representative embodiment of the invention, a plurality of mounting tabs 56 extend from the edge 46 of the top plate 42 along the same plane as the top plate 42. The cover 52 is then coupled to the axle slider 36 by way of the mounting tabs 56.

A swingarm 58 and the mounting plate 44 are coupled together by way of a rod 60. The rod 60 is coupled to the mounting plate 44 and extends perpendicularly from an inner surface 62 of the mounting plate 44. As shown in FIG.

3, the swingarm 58 is disposed adjacent the inner surface 62 of the mounting plate and 44 and within the cavity 50 described above. The rod 60 is received by the swingarm 58 in a first bearing holder 64. As a result of the above, the rod 60 provides a first pivot axis 66 for the swingarm 58 to pivot with respect to the chassis frame 14, by way of the mounting plate 44 of the axle slider 36. The first pivot axis 66 may also be referred to as a suspension axis 66.

Figure 4:
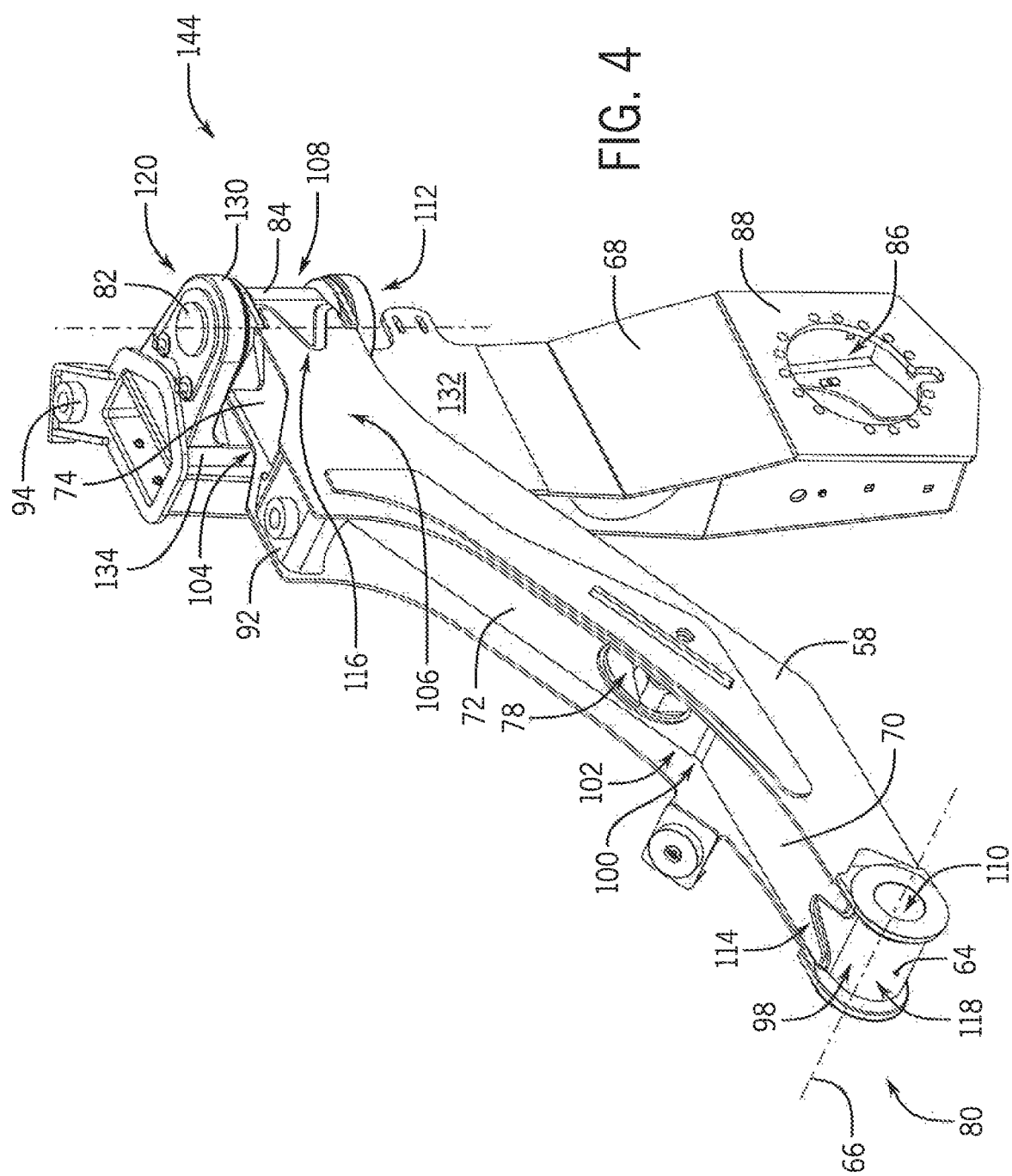
FIG. 4 is an isometric view of a swingarm and wheel support leg of the agricultural machine.
Figure 5:
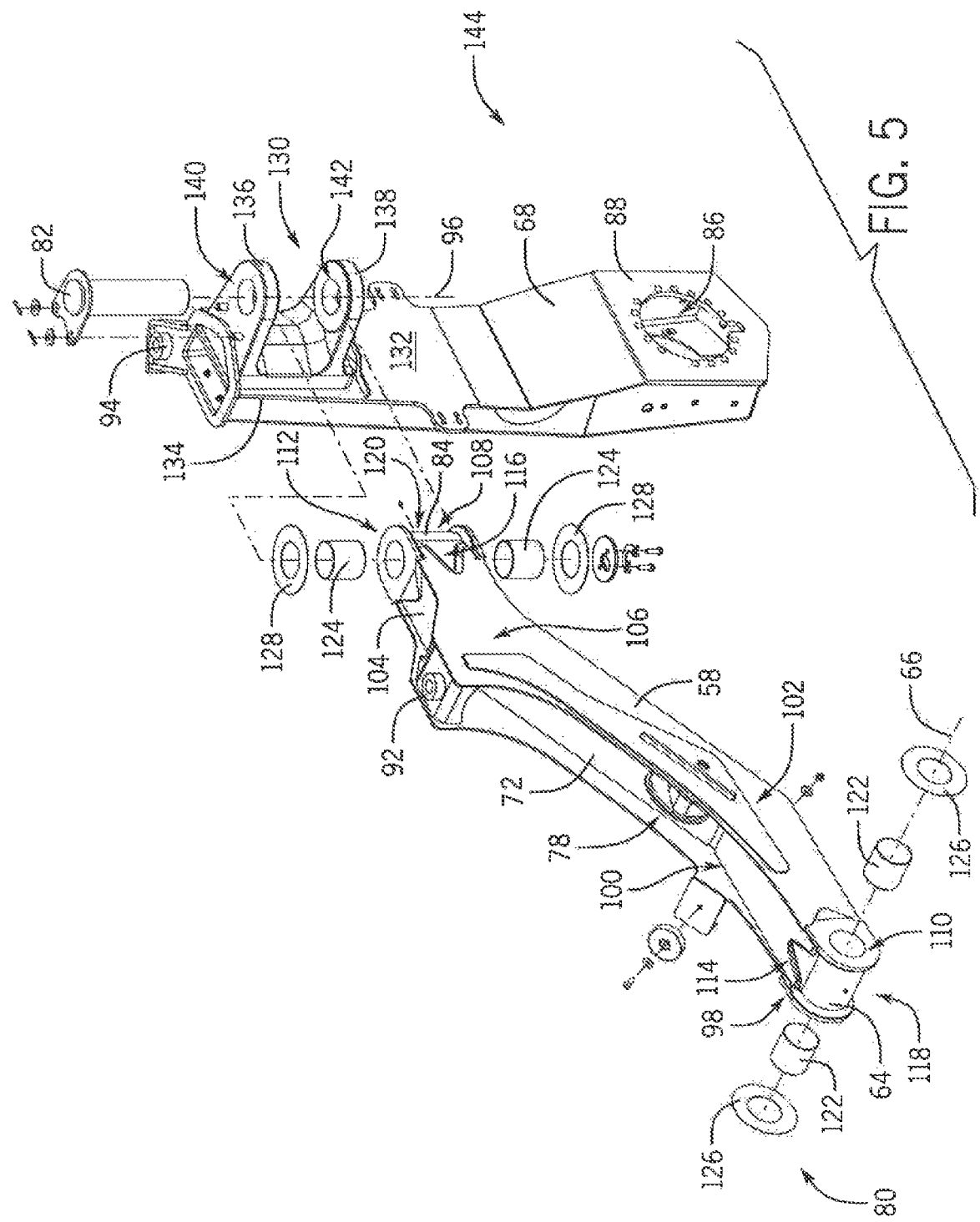
FIG. 5 is an exploded isometric view of the swingarm and wheel support leg of FIG. 4.

As will be further described with respect to FIGS. 4 and 5, the swingarm 58 include a first swingarm leg 70, a main body 72, and a second swingarm leg 74. In the representative embodiment of the invention, the swingarm 58 is shown as a weldment with separated pieces that are welded together, along with a cast steel or other cast metal bearing assembly welded into the rest of the overall swingarm weldment at its opposite ends. The first bearing holder 64 is shown permanently coupled, for example, hut not limited to, welded, to the first swingarm leg 70 of the swingarm 58. In addition, a shock absorber 76 is coupled to the main body 72 of the swingarm 58. The shock absorber 76 extends from the main body 72 of the swingarm 58 to a location 78 on the mounting plate 44 of the axle slider 36 of the chassis frame 14. In the representative embodiment of the invention, the location 78 is located on the inner surface 62 of the mounting plate 44 and adjacent the edge 46 of the top plate 42 of the axle slider 36. However, in other embodiments of the invention, the location 78 may be anywhere on the mounting plate 44, anywhere on the axle slider 36, or anywhere on the chassis frame 14. The combination of the swingarm 58, the first pivot axis 66, and the shock absorber 76 form a suspension system 80 of the sprayer 10.

The swingarm 58 is also coupled to a wheel support leg 68 by way of a steering pin 82 so that the wheel support leg 68 is pivotally attached to and extends generally vertically down from a cast bearing holder at the front of swingarm 58. For example, the steering pin 82 is inserted into a second bearing holder 84 of the swingarm 58. The second bearing holder 84 is permanently coupled, for example, but not limited to, welded, to the second swingarm leg 74 of the swingarm. The alignment of the swingarm 58 and the wheel support leg 68 will be further described below in regard to FIGS. 4 and 5.

The wheel support leg 68 includes an orifice 86 disposed at a lower portion 88 of the wheel support leg 68. The orifice 86 operates as an attachment point for coupling a wheel 22 to the wheel support leg 68. For example, the orifice 86 may be configured to receive a wheel axle (not shown) in order to attach a wheel 22 to the wheel support leg 68. In the representative embodiment of the invention, the wheel support leg 68 is disposed adjacent a front portion 14a of the chassis frame 14 and the lift arm assembly 32.

FIGS. 2 and 3 further depict a hydraulic device 142, such as, but not limited to, a hydraulic cylinder, coupled to a top surface 92 of the swingarm 58 and a top surface 94 of the wheel support leg 68. As shown, the hydraulic cylinder 90 extends from the swingarm 58 to the wheel support leg 68. In turn, the hydraulic cylinder 90 controls the steering of the sprayer 10 by controlling the pivot of the wheel support leg 68 and the swingarm 58 along a second pivot axis 96 aligned with the steering pin 82. The second pivot axis 96 may also be referred to as a steering axis 96.

Now referring to FIGS. 4 and 5, isometric and exploded isometric views of the swingarm 58 and the wheel support leg 68 are shown. As discussed above, the swingarm 58 includes a first swingarm leg 70, a main body 72, and a second swingarm leg 74. The first swingarm leg 70 includes a first end 98 and a second end 100. Similarly, the main body 72 includes a first end 102 and a second end 104. The first end 102 of the main body 72 is aligned with the second end 100 of the first swingarm leg 70, as the main body 72 extends from the first swingarm leg 70 at an angle. The second swingarm leg 74 also includes a first end 106 and a second end 10$. The first end 106 of the second swingarm leg 74 is aligned with the second end 104 of the main body 72, and the second swingarm leg 74 extends horizontally from the main body 72.

In the representative embodiment of the invention, the first swingarm leg 70 is oriented along a horizontal plane. However, it is also contemplated that the first swingarm leg 70 may be oriented at an angle with respect to the horizontal plane. In addition, while the representative embodiment of the invention illustrates the main body 72 extending at a 45 degree angle from the first swingarm leg 70, it is contemplated that the main body 72 may extend from the first swingarm leg 70 at any angle. Further, while the representative embodiment of the invention illustrates the second swingarm leg 74 as being oriented along a horizontal plane, the second swingarm leg 74 may be oriented at any angle in various embodiments of the invention.

FIGS. 4 and 5 further illustrate that the first and second swingarm legs 70, 74 of the swingarm 58 are oriented parallel to each other along differing horizontal planes. In alternative embodiments of the invention, the first and second swingarm legs 70, 74 may be oriented at angles other than parallel to each other. In yet other embodiments of the invention, the first and second swingarm legs 70, 74 may be oriented along the same plane, be it horizontal or otherwise.

As briefly mentioned above, the swingarm includes first and second bearing holders 64, 84. In the representative embodiment of the invention, the first and second bearing holders 64, 84 are identically constructed with orifices 110, 112, respectively and each of which may have a single grease fitting to direct grease into the respective joint. The first bearing, holder 64 is welded to the first end 98 of the first swingarm leg 70 with the orifice 110 oriented horizontally to form the first pivot axis 66. As shown in FIGS. 4 and 5, the first end 98 of the first swingarm leg 70—also referred to as a first end 118 of the swingarm 58—include a notch 114 formed therein to partially received the first bearing holder 64, which is then welded thereto.

The second bearing holder 84 is welded to the second end 108 of the second swingarm leg 74 with the cavity 112 oriented vertically to form the second pivot axis 96. Similar to the first end 98 of the first swingarm leg 70, the second end 108 of the second swingarm leg 74 also referred to as a second end 120 of the swingarm 58—includes a notch 116 formed therein to partially receive the second bearing holder 64, which is then welded thereto. As stated above, bearing holders 64, 84 are of identical design and constructed so that they may be used interchangeably at the first and second ends 118, 120 and each may include a single grease fitting. The orientation of the bearing holders 64, 84 at the first and second ends 118, 120 of the swingarm 58 are dependent on the notches 114, 116. That is, the notch 114 at the first end 118 of the swingarm 58 is configured to orient the bearing holder 64 and its orifice 110 horizontally, while the notch 116 at the second end 120 of the swingarm 58 is configured to orient the bearing holder 84 and its orifice 112 vertically.

As shown in FIG. 5, the first bearing holder 64 includes at least one bearing 122 disposed within the orifice 110 of the first bearing holder 64. The at least one bearing 122 assists with limiting friction when the swingarm 58 is pivoted about the suspension axis 66 and the rod 60 extending from the chassis frame 14. Thrust washers 124 are also disposed at the ends of the first bearing holder 64 to maintain alignment of the components within the orifice 110.

Similarly, the second bearing holder 84 includes at least one bearing 124 disposed within the orifice 112 of the second bearing holder 84, which assist with limiting friction when the swingarm 58 and the wheel support leg 68 pivot with respect to each other about the steering axis 96 and the steering pin 82 disposed therein. In addition, thrust washers 128 may be disposed at the ends of the second bearing holder 84 to maintain alignment of the components within the orifice 112. Due to the common construction of the first and second bearing holders 64, 84, the bearings 122, 124 and thrust washers 126, 128 may also be of the same construction.

FIGS. 5 and 6 also further depict the location 78 along the main body 72 of the swingarm 58 wherein the shock absorber 76 is coupled to the swingarm 58. In the representative embodiment of the invention, the location 78 is disposed adjacent the first end 102 of the main body 72. However, the location 78 may be anywhere along the main body 72 of the swingarm 58 in varying embodiments of the invention.

The alignment of the second bearing holder 84 of the swingarm 58, the steering pin 82, and a mounting bracket 130 of the wheel support leg 68 is shown in greater detail in FIGS. 4 and 5. The mounting bracket 130 is coupled to an outer surface 132 of the wheel support leg 68 at an upper portion 134 of the wheel support leg 68, which is adjacent the top surface 94 of the wheel support leg 68. In the representative embodiment of the invention, the mounting bracket 130 includes an upper mounting arm 136 and a lower mounting arm 138, each extending perpendicularly from the wheel support leg 68 and spaced apart from each other. In alternative embodiments of the invention, the mounting bracket 130 may include more or less than two (2) mounting arms.

Each mounting arm 136, 138 may include an orifice 140, 142, respectively, formed therethrough. The orifices 140, 142 are aligned with each other and sized to receive the steering pin 82. As shown in FIG. 5, the upper and lower mounting arms 136, 138 are spaced apart from each other so as to receive the second bearing holder 84 of the swingarm 58. When properly aligned, the orifices 140, 142 of the mounting arms 136, 138 and the orifice 112 of the second bearing holder 84 are aligned along the second rotation axis 96 and able to receive the steering pin 82. As a result of the above, the swingarm 58 and the wheel support leg 68 are pivotably coupled to each other about the steering pin 82 and the second rotation axis 96.

As previously described, the hydraulic cylinder 90 is coupled to the top surfaces 92, 94 of the swingarm 58 and wheel support leg 68, respectively. The pivoting of the swingarm 58 and the wheel support leg 68 about the steering axis 96 is controlled by the expansion and contraction of the hydraulic cylinder 90. As such, the combination of the swingarm 58, the wheel support leg 68, the hydraulic cylinder 90, the steering pin 82, and the second pivot axis 96 form a steering system 144 of the sprayer 10.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A swingarm of an agricultural sprayer comprising:
a first swingarm leg having a first end and a second end, the first swingarm leg oriented along a first horizontal plane;
a main body extending at an angle from the second end of the first swingarm leg at an angle, the main body having a first end and a second end, wherein the first end is aligned with the second end of the first swingarm leg;
a second swingarm leg extending from the second end of the main body along a second horizontal plane, the second swingarm leg having a first end and a second end, wherein the first end is aligned with the second end of the main body;
a first bearing holder coupled to the first end of the first swingarm leg, the first bearing holder having a cavity oriented horizontally to form a first pivot axis;
a second bearing holder coupled to the second end of the second swingarm leg, the second bearing holder having a cavity oriented vertically to form a second pivot axis which is vertically orientated;
a wheel support leg having a mounting bracket pivotably connected to the second bearing holder such that the wheel support leg is pivotable with respect to the second swingarm leg about the second pivot axis; and
a hydraulic cylinder is coupled to the swingarm and the wheel support leg to control movement of the wheel support leg about the second pivot axis;
wherein the first and second bearing holders are of the same construction.

2. The swingarm of claim 1 wherein the first bearing holder receives a rod to pivotably couple the swingarm to a chassis frame of the sprayer along the first pivot axis.

3. The swingarm of claim 2 wherein a shock absorber is coupled to and disposed between the main body of the swingarm and the chassis frame of the sprayer.

4. The swingarm of claim 3 wherein the swingarm, the first pivot axis, and the shock absorber form a suspension system of the agricultural sprayer.

5. The swingarm of claim 1 wherein the second bearing holder receives a steering pin to pivotably couple the swingarm to the wheel support leg of the sprayer along the second pivot axis.

6. The swingarm of claim 1 wherein the first and second swingarm legs are oriented parallel to each other on different planes.

7. A swingarm of an agricultural sprayer comprising:
a first swingarm leg having a first end and a second end, the first swingarm leg oriented along a first horizontal plane;
a main body extending at an angle from the second end of the first swingarm leg at an angle, the main body having a first end and a second end, wherein the first end is aligned with the second end of the first swingarm leg;
a second swingarm leg extending from the second end of the main body along a second horizontal plane, the second swingarm leg having a first end and a second end, wherein the first end is aligned with the second end of the main body;
a first bearing holder coupled to the first end of the first swingarm leg, the first bearing holder having a cavity oriented horizontally to form a first pivot axis; and
a second bearing holder coupled to the second end of the second swingarm leg, the second bearing holder having a cavity oriented vertically to form a second pivot axis; and wherein:
the first and second bearing holders are of the same construction;
the second bearing holder receives a steering pin to pivotably couple the swingarm to a wheel support leg of the sprayer along the second pivot axis;
the wheel support leg includes a mounting bracket having:
an upper mounting arm and a lower mounting arm;
a first orifice formed through the upper mounting arm; and
a second orifice formed through the mounting arm and aligned with the first orifice; and
the second bearing holder of the swingarm is disposed between the upper and lower mounting arms to align the cavity of the second bearing holder with the first orifice of the upper mounting arm and the second orifice of the lower mounting arm along the second pivot axis.

8. The swingarm of claim 7 wherein the swingarm, the wheel support leg, the hydraulic cylinder, the steering pin, and the second pivot axis form a steering system of the agricultural sprayer.

9. A suspension system of an agricultural sprayer comprising:
a swingarm having:
a first swingarm leg having a first end and a second end;
a main body having a first end and a second end and extending therebetween, the first end of the main body aligned with the second end of the first swingarm leg;
a second swingarm leg having a first end and a second end and extending therebetween, the first end of the second swingarm aligned with the second end of the main body;
a first bearing holder coupled to the first end of the first swingarm leg, the first bearing holder having a cavity oriented horizontally to form a first pivot axis;
a second bearing holder coupled to the second end of the second swingarm leg, the second bearing holder having a cavity oriented vertically to form a second pivot axis which is vertically orientated;
a wheel support leg having a mounting bracket pivotably connected to the second bearing holder such that the wheel support leg is pivotable with respect to the second swingarm leg about the second pivot axis; and
a hydraulic cylinder is coupled to the swingarm and the wheel support leg to control movement of the wheel support leg about the second pivot axis;
a chassis frame having a rod extending perpendicularly therefrom and into the cavity along the first pivot axis; and
a shock absorber coupled to and extending between the main body of the swingarm and the chassis frame;
wherein the first and second bearing holders are of the same construction.

10. The suspension system of claim 9 wherein the swingarm and the chassis frame are pivotably connected about the first pivot axis.

11. The suspension system of claim 9 wherein the first swingarm leg is oriented horizontally, the main body of the swingarm extends from the first swingarm leg at an angle, and the second swingarm leg extends horizontally from the main body.

12. The suspension system of claim 11 wherein the first and second swingarm legs are oriented parallel to each other on different planes.

13. A suspension system of an agricultural sprayer comprising:

a swingarm having:
a first swingarm leg having a first end and a second end;
a main body extending from a first end to a second end, the first end aligned with the second end of the first swingarm leg;
a second swingarm leg extending from a first end to a second end, the first end aligned with the second end of the main body;
a first bearing holder coupled to the first end of the first swingarm leg, the first bearing holder having a cavity oriented horizontally to form a first pivot axis;
a second bearing holder coupled to the second end of the second swingarm leg the second bearing holder having a cavity oriented vertically to form a second pivot axis;
a chassis frame having a rod extending perpendicularly therefrom and into the cavity along the first pivot axis; and
a shock absorber coupled to and extending between the main body of the swingarm and the chassis frame;
wherein:
the first and second bearing holders are of the same construction;
the rod extends perpendicularly from a mounting plate of an axle slider of the chassis frame.

14. A steering system of an agricultural sprayer comprising:
a swingarm having:
a first swingarm leg having a first end and a second end;
a main body having a first end and a second end, the first end of the main body aligned with the second end of the first swingarm leg;
a second swingarm leg having a first end and to a second end, the first end of the second swingarm aligned with the second end of the main body;
a first bearing holder coupled to the first end of the first swingarm leg, the first bearing holder having a cavity oriented horizontally to form a first pivot axis;
a second bearing holder coupled to the second end of the second swingarm leg, the second bearing holder having a cavity oriented vertically to form a second pivot axis; and
wherein the first and second bearing holders are of the same construction;
a wheel support leg having:
a main body having an upper portion and a lower portion;
a mounting bracket disposed on an outer surface of the main body at the upper portion of the main body, the mounting bracket having at least one orifice aligned with the second pivot axis;
an orifice formed through the main body at the lower portion of the main body;
a steering pin oriented along the second pivot axis and disposed through the cavity of the second bearing holder and the at least one orifice of the mounting bracket; and
a hydraulic device coupled to and extending from a top surface of the swingarm to a top surface of the wheel support leg.

15. The steering system of claim 14 wherein the mounting bracket of the wheel support leg includes an upper mounting arm and a lower mounting arm;
wherein the at least one orifice of the mounting bracket includes a first orifice formed through the upper mounting arm and a second orifice formed through the mounting arm and aligned with the first orifice; and wherein the second bearing holder of the swingarm is disposed between the upper and lower mounting arms to align the cavity of the second bearing holder with the first orifice of the upper mounting arm and the second orifice of the lower mounting arm.

16. The steering system of claim 14 wherein the swingarm and the wheel support leg are pivotably connected about the second pivot axis.

17. The steering system of claim 14 wherein a wheel axle is disposed within the orifice at the lower portion of the wheel support leg to couple a wheel to the wheel support leg.

18. The steering system of claim 14 wherein the first swingarm leg is oriented horizontally, the main body of the swingarm extends from the first swingarm leg at an angle, and the second swingarm leg extends horizontally from the main body.

19. The steering system of claim 18 wherein the first and second swingarm legs are oriented parallel to each other on different planes.

\* \* \* \* \*